United States Patent
Kim et al.

(10) Patent No.: US 11,579,658 B2
(45) Date of Patent: Feb. 14, 2023

(54) FOLDABLE DISPLAY DEVICE INCLUDING HINGE PART

(71) Applicant: Samsung Display Co., Ltd., Yongin-si (KR)

(72) Inventors: Seyong Kim, Gimpo-si (KR); In Soo Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/699,753

(22) Filed: Dec. 2, 2019

(65) Prior Publication Data

US 2020/0341522 A1 Oct. 29, 2020

(30) Foreign Application Priority Data

Apr. 29, 2019 (KR) .......................... 10-2019-0049612

(51) Int. Cl.
*G06F 1/16* (2006.01)
*G09F 9/30* (2006.01)

(52) U.S. Cl.
CPC .......... *G06F 1/1681* (2013.01); *G06F 1/1626* (2013.01); *G06F 1/1652* (2013.01); *G09F 9/301* (2013.01)

(58) Field of Classification Search
CPC ....... G06F 1/1681; G06F 1/1652; G09F 9/301
See application file for complete search history.

(56) References Cited

U.S. PATENT DOCUMENTS

| | | | | |
|---|---|---|---|---|
| 9,047,055 | B2* | 6/2015 | Song | G06F 1/1652 |
| 10,015,897 | B1 | 7/2018 | Hong et al. | |
| 10,185,355 | B2* | 1/2019 | Watamura | G06F 1/1641 |
| 10,228,724 | B2* | 3/2019 | Nakamura | G06F 1/1677 |
| 10,274,997 | B2* | 4/2019 | Lin | G06F 1/1616 |
| 10,347,852 | B2 | 7/2019 | Myeong et al. | |
| 10,368,452 | B2* | 7/2019 | Yun | H01L 51/0097 |
| 10,423,196 | B2* | 9/2019 | Seo | G06F 1/1681 |
| 10,558,242 | B2* | 2/2020 | Kim | G09F 9/301 |
| 10,948,947 | B2* | 3/2021 | Yoon | G06F 1/1626 |
| 11,048,302 | B2* | 6/2021 | Seo | H04M 1/0268 |
| 2014/0196254 | A1* | 7/2014 | Song | G06F 1/1681 16/302 |
| 2015/0055287 | A1* | 2/2015 | Seo | G06F 1/1681 361/679.27 |

(Continued)

FOREIGN PATENT DOCUMENTS

KR 10-2015-0099676 9/2015
KR 10-2018-0056444 5/2018

*Primary Examiner* — Rockshana D Chowdhury
*Assistant Examiner* — Douglas R Burtner
(74) *Attorney, Agent, or Firm* — H.C. Park & Associates, PLC

(57) ABSTRACT

A display device including a display module including a first non-folding area, a second non-folding area, and a folding area disposed between the first and second non-folding areas, a first support part disposed below the first non-folding area, a second support part disposed below the second non-folding area, a hinge part disposed below the folding area, a sheet part disposed between the folding area and the hinge part, and a support plate disposed between the sheet part and the hinge part, the support plate having a plurality of openings overlapping a portion of the hinge part in a plan view.

16 Claims, 18 Drawing Sheets

(56) References Cited

U.S. PATENT DOCUMENTS

| | | | |
|---|---|---|---|
| 2015/0257289 A1* | 9/2015 | Lee | H05K 5/0226 |
| | | | 361/749 |
| 2016/0132076 A1* | 5/2016 | Bitz | H04M 1/022 |
| | | | 361/679.27 |
| 2018/0024589 A1* | 1/2018 | Nakamura | G06F 1/166 |
| | | | 361/679.09 |
| 2018/0024590 A1* | 1/2018 | Nakamura | G06F 3/041 |
| | | | 349/58 |
| 2018/0145269 A1 | 5/2018 | Myeong et al. | |
| 2018/0309861 A1* | 10/2018 | Lin | G06F 1/1681 |
| 2019/0040904 A1* | 2/2019 | Hsu | G06F 1/1641 |
| 2019/0086965 A1* | 3/2019 | Kuramochi | G06F 1/1616 |
| 2019/0098783 A1* | 3/2019 | Zhang | H05K 5/0017 |
| 2019/0112852 A1* | 4/2019 | Hsu | E05D 11/105 |
| 2019/0163241 A1* | 5/2019 | Moon | G06F 1/1641 |
| 2019/0196548 A1* | 6/2019 | Kim | G06F 1/1681 |
| 2019/0307004 A1* | 10/2019 | Fan | H05K 5/00 |
| 2020/0042042 A1* | 2/2020 | Park | G06F 1/1681 |
| 2020/0117233 A1* | 4/2020 | Ou | E05D 7/00 |
| 2020/0117245 A1* | 4/2020 | Ou | G06F 1/1681 |
| 2020/0170127 A1* | 5/2020 | Kim | H05K 5/0226 |
| 2020/0267849 A1* | 8/2020 | Kim | H04M 1/0262 |
| 2020/0319672 A1* | 10/2020 | Kim | G06F 1/1656 |
| 2020/0326757 A1* | 10/2020 | Huang | G06F 1/1616 |
| 2021/0200277 A1* | 7/2021 | Park | G06F 1/16 |
| 2021/0216109 A1* | 7/2021 | Lin | F16C 11/045 |
| 2021/0368032 A1* | 11/2021 | Liao | G06F 1/1681 |

\* cited by examiner

FOLDABLE DISPLAY DEVICE INCLUDING HINGE PART

CROSS-REFERENCE TO RELATED APPLICATION

This application claims priority from and the benefit of Korean Patent Application No. 10-2019-0049612, filed on Apr. 29, 2019, which is hereby incorporated by reference for all purposes as if fully set forth herein.

BACKGROUND

Field

Exemplary embodiments of the invention relate generally to a display device, and more specifically, to a display device that is capable of preventing a folding area from being deformed.

Discussion of the Background

Electronic equipment for providing an image to a user, such as smartphones, digital cameras, laptop computers, navigations, and smart televisions, includes a display device for displaying an image. The display device generates an image to provide the image to the user through a display screen.

In recent years, various types of display devices have been developed with the development of technology of display devices. For example, various flexible display devices that are deformed into a curved shape, folded, or rolled are being developed. Flexible display devices, of which shapes thereof may be variously modified, can be easily carried and improve user's convenience.

Among the flexible display devices, a foldable display device includes a display module that can be folded based on a folding axis extending in one direction. The display module may be folded or unfolded about the folding axis.

The above information disclosed in this Background section is only for understanding of the background of the inventive concepts, and, therefore, it may contain information that does not constitute prior art.

SUMMARY

Display devices constructed according to exemplary implementations of the invention are capable of preventing a folding area from being deformed.

Additional features of the inventive concepts will be set forth in the description which follows, and in part will be apparent from the description, or may be learned by practice of the inventive concepts.

A display device according to an exemplary embodiment includes a display module including a first non-folding area, a second non-folding area, and a folding area disposed between the first and second non-folding areas, a first support part disposed below the first non-folding area, a second support part disposed below the second non-folding area, a hinge part disposed below the folding area, a sheet part disposed between the folding area and the hinge part, and a support plate disposed between the sheet part and the hinge part, the support plate having a plurality of openings overlapping a portion of the hinge part in a plan view.

A display device according to another exemplary embodiment includes a display module including a first non-folding area, a second non-folding area, and a folding area disposed between the first and second non-folding areas, the first and second non-folding areas and the folding area arranged in a first direction, a first support part disposed below the first non-folding area, a second support part disposed below the second non-folding area, a hinge part disposed below the folding area and extending in a second direction crossing the first direction, the hinge part defining a first rotation axis and a second rotation axis spaced apart from each other in the first direction, and a support plate disposed between the folding area and the hinge part, the support plate having a plurality of openings overlapping the first and second rotation axes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
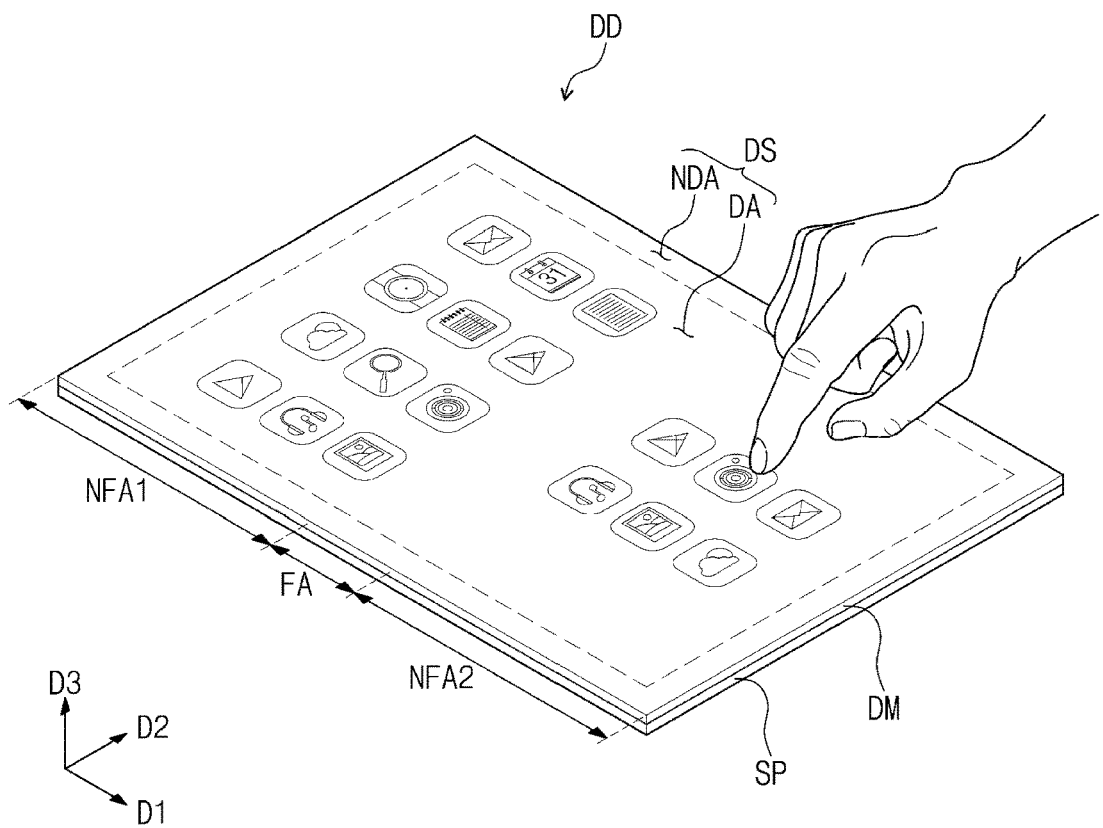
FIG. 1 is a perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
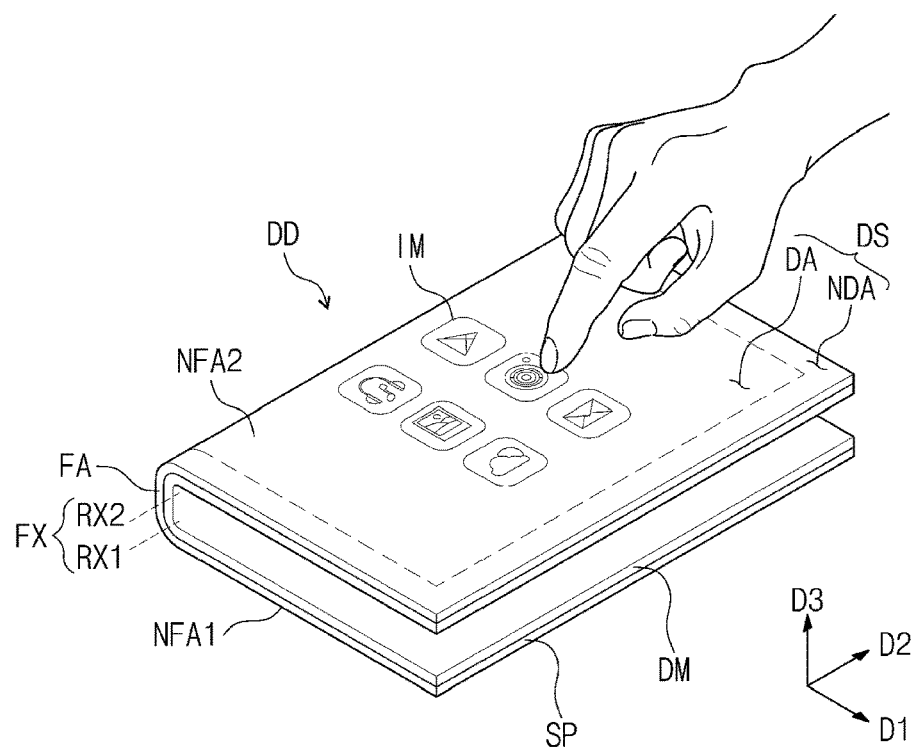
FIG. 2 is a view illustrating a folded state of the display device of FIG. 1.

FIG. 1 is a perspective view of a display device according to an exemplary embodiment. FIG. 2 is a view illustrating a folded state of the display device of FIG. 1.

Referring to FIGS. 1 and 2, a display device DD according to an exemplary embodiment has substantially a rectangular shape with a long side in a first direction D1 and a short side in a second direction D2 crossing the first direction D1. However, the inventive concepts are not limited thereto. For example, in some exemplary embodiments, the display device DD may have various other shapes.

The display device DD may be a flexible display device, such as a folding-type (foldable) display device that can be folded or unfolded about a folding axis FX extending in the second direction D2. The folding axis FX may include a first rotation axis RX1 and a second rotation axis RX2, which are adjacent to each other and extend in the second direction D2 to provide biaxial rotation axes to the display device DD.

The display device DD may include a display module DM and a support part SP disposed below the display module DM. The display module DM may be a flexible display module. A top surface of the display module DM may be defined as a display surface DS and have a plane defined by the first direction D1 and the second direction D2. Images IM generated from the display module DM may be provided to a user through the display surface DS.

The display surface DS may include a display area DA, on which an image is displayed, and a non-display area NDA around th display area DA. The non-display area NDA may surround the display area DA and provide an edge portion of the display device DD, which may be printed with a predetermined color.

The display module DM may include a folding area FA and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The folding area FA and the first and second non-folding areas NFA1 and NFA2 may be arranged in the first direction D1. The folding area FA may overlap the first and second rotation axes RX1 and RX2.

Although the display device DD according to the illustrated exemplary embodiment is described as having one folding area FA and two first and second non-folding areas NFA1 and NFA2, however, the inventive concepts are not limited thereto. In some exemplary embodiments, the number of folding area FA and the number of non-folding areas NFA1 and NFA2 may be variously changed. For example, the display module DM may include a plurality of non-folding areas greater than two and a plurality of folding areas disposed between the non-folding areas.

The support part SP may support the display module DM, and be folded by rotating about the first and second rotation axes RX1 and RX2. As the support part SP is folded, the display module DM may be folded by the support part SP. For example, the folding area FA may be bent so that the display module DM is folded.

The support part SP may out-fold the display device DD, so that the display surface DS of the display module DM are exposed to the outside when the display device DD is folded. The configuration of the support part SP will be described in more detail below.

Figure 3:
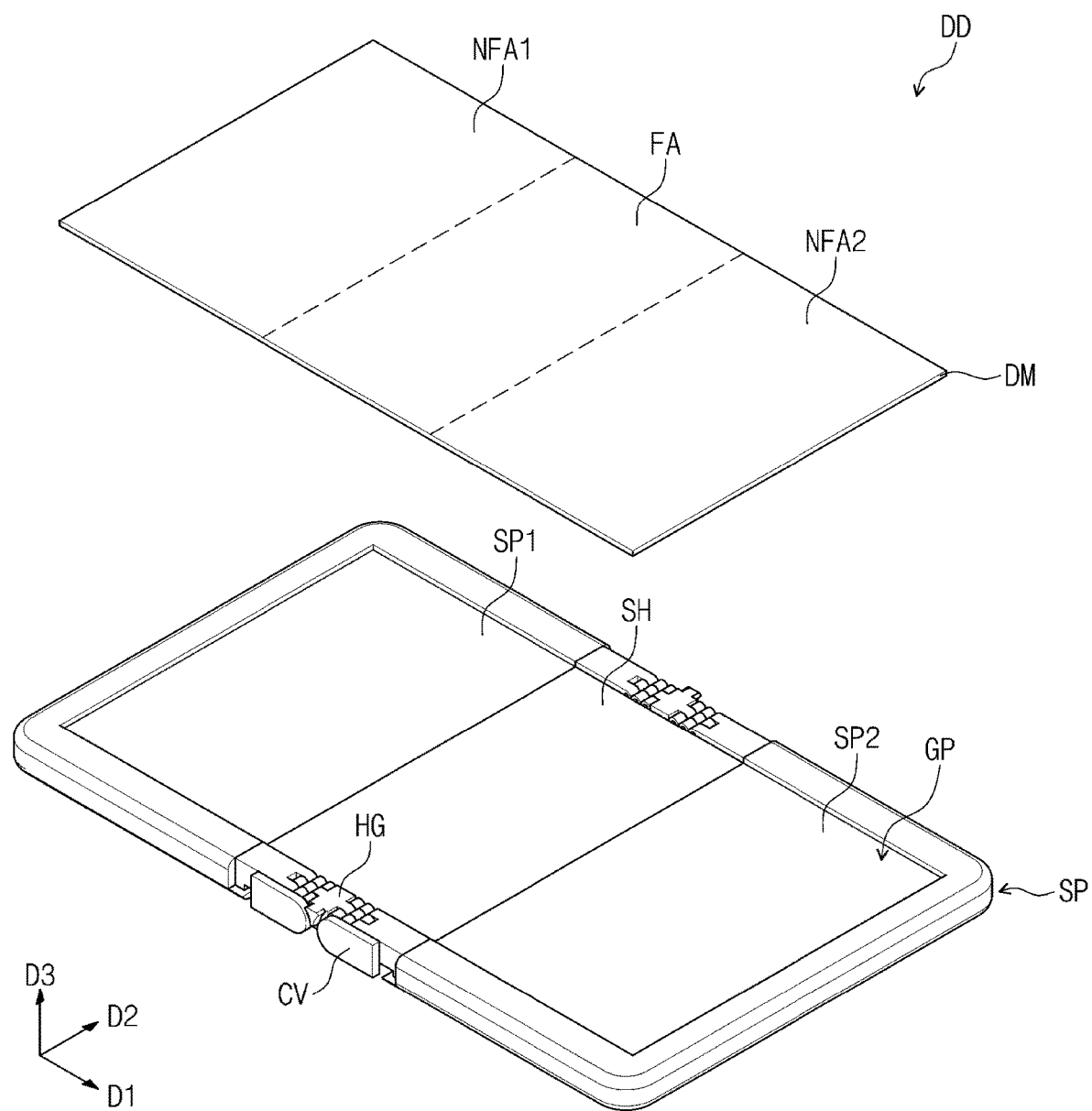
FIG. 3 is a perspective view illustrating a display module and a support part of FIG. 1.

FIG. 3 is a perspective view of a display module and a support part of FIG. 1.

Referring to FIG. 3, the support part SP may include a first support part SP1, a second support part SP2, a hinge part HG, a sheet part SH, and a plurality of cover parts CV. In some exemplary embodiments, the support plate may be disposed below the sheet part SH. A configuration of the support plate will be described in more detail below.

The first support part SP1 may be disposed below the first non-folding area NFA1. The second support part SP2 may be disposed below the second non-folding area NFA2. The hinge part HG and the sheet part SH may be disposed below the folding area FA.

In some exemplary embodiments, the hinge part HG may extend in the second direction D2 and be also disposed below the sheet part SH. More particularly, the hinge part HG may extend in the second direction D2, and the sheet part SH may be disposed on the hinge part HG overlapping the folding area FA.

The hinge part HG and the sheet part SH may be disposed between the first support part SP1 and the second support part SP2. The sheet part SH may be disposed between the hinge part HG and the folding area FA. The hinge part HG and the first and second support parts SP1 and SP2 may be arranged in the first direction D1. The cover parts CV may be disposed on both sides of the hinge part HG, which are opposite to each other in the second direction D2.

The first support part SP1 and the second support part SP2 may be connected to both sides of the hinge part HG, which are opposite to each other in the first direction D1. A groove part GP may be defined in each of the first support part SP1, the second support part SP2, and the hinge part HG. When the first support part SP1 and the second support part SP2 are connected to the hinge part HG, the groove parts GP may be continuously defined in the first support part SP1, the second support part SP2, and the hinge part HG. The display module DM may be disposed in the groove part GP.

Figure 4:
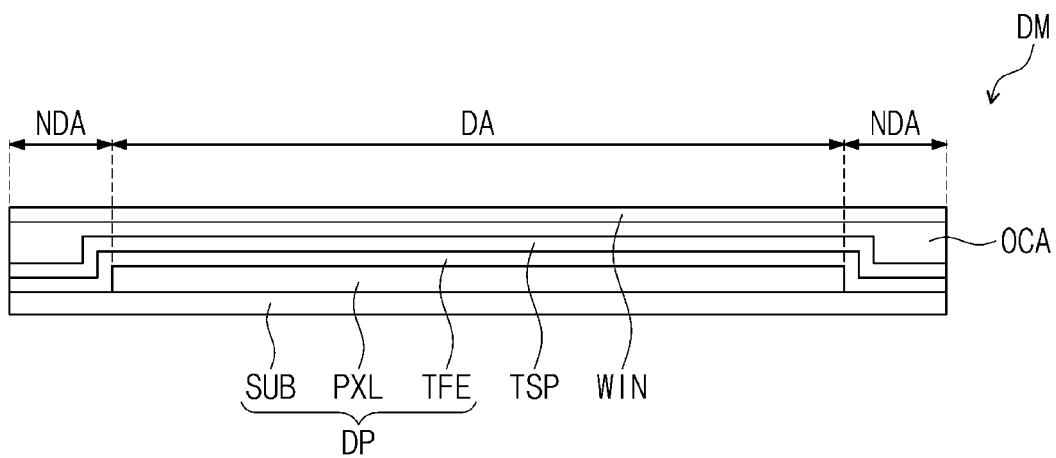
FIG. 4 is a schematic cross-sectional view of the display module of FIG. 3.

FIG. 4 is a schematic cross-sectional view of the display module of FIG. 3.

Referring to FIG. 4, the display module DM may include a display panel DP, a touch sensing part TSP disposed on the display panel DP, a window WIN disposed on the touch sensing part TSP, and an adhesive OCA disposed between the touch sensing part TSP and the window WIN.

The display panel DP according to an exemplary embodiment of the may be an emission type display panel, without being limited thereto. For example, the display panel DP may be an organic light emitting display panel or a quantum dot light emitting display panel. The organic light emitting display panel may include an organic light emitting material. A light emitting layer of the quantum dot light emitting display panel may include a quantum dot, a quantum rod, and the like. Hereinafter, the display panel DP will be described with reference to the organic light emitting display panel.

The display panel DP may be a flexible display panel. The display panel DP may include a substrate SUB, a pixel layer PXL disposed on the substrate SUB, and a thin film encapsulation layer TFE disposed on the substrate SUB to cover the pixel layer PXL. The substrate SUB may be a transparent substrate and include a flexible plastic substrate. For example, the substrate SUB may include polyimide (PI).

The substrate SUB may include a display area DA and a non-display area NDA around the display area DA, as the display surface DS. The pixel layer PXL may be disposed on the display area DA. The pixel layer PXL may include a plurality of pixels, and each of the pixels may include a light emitting element.

The thin film encapsulation layer TFE may include at least two inorganic layers and an organic layer disposed between the inorganic layers. The inorganic layers may include an inorganic material and protect the pixel layer PXL from moisture/oxygen. The organic layer may include an organic material and protect the pixel layer PXL from foreign substances, such as dust particles.

The touch sensing part TSP may be disposed on the thin film encapsulation layer TFE. The touch sensing part TSP may sense an external input (e.g., user's hand, touch pen, or the like) to change the external input into a predetermined input signal. The touch sensing part TSP may include a plurality of sensing electrodes that sense the external input. The sensing electrodes may sense the external input in a capacitive manner, for example.

The touch sensing part TSP may be directly manufactured on the thin film encapsulation layer TFE when the display module DM is manufactured. However, the inventive concepts are not limited thereto. For example, in some exemplary embodiments, the touch sensing part TSP may be manufactured as a touch panel that is separated from the display panel DP, and then be attached to the display panel DP using an adhesive.

The window WIN may protect the display panel DP and the touch sensing part TSP from external scratch and impact. The window WIN may be attached to the touch sensing part TSP by the adhesive OCA. The adhesive OCA may include an optical clear adhesive. An image generated in the display panel DP may pass through the window WIN, and then be provided to the user.

Figure 5:
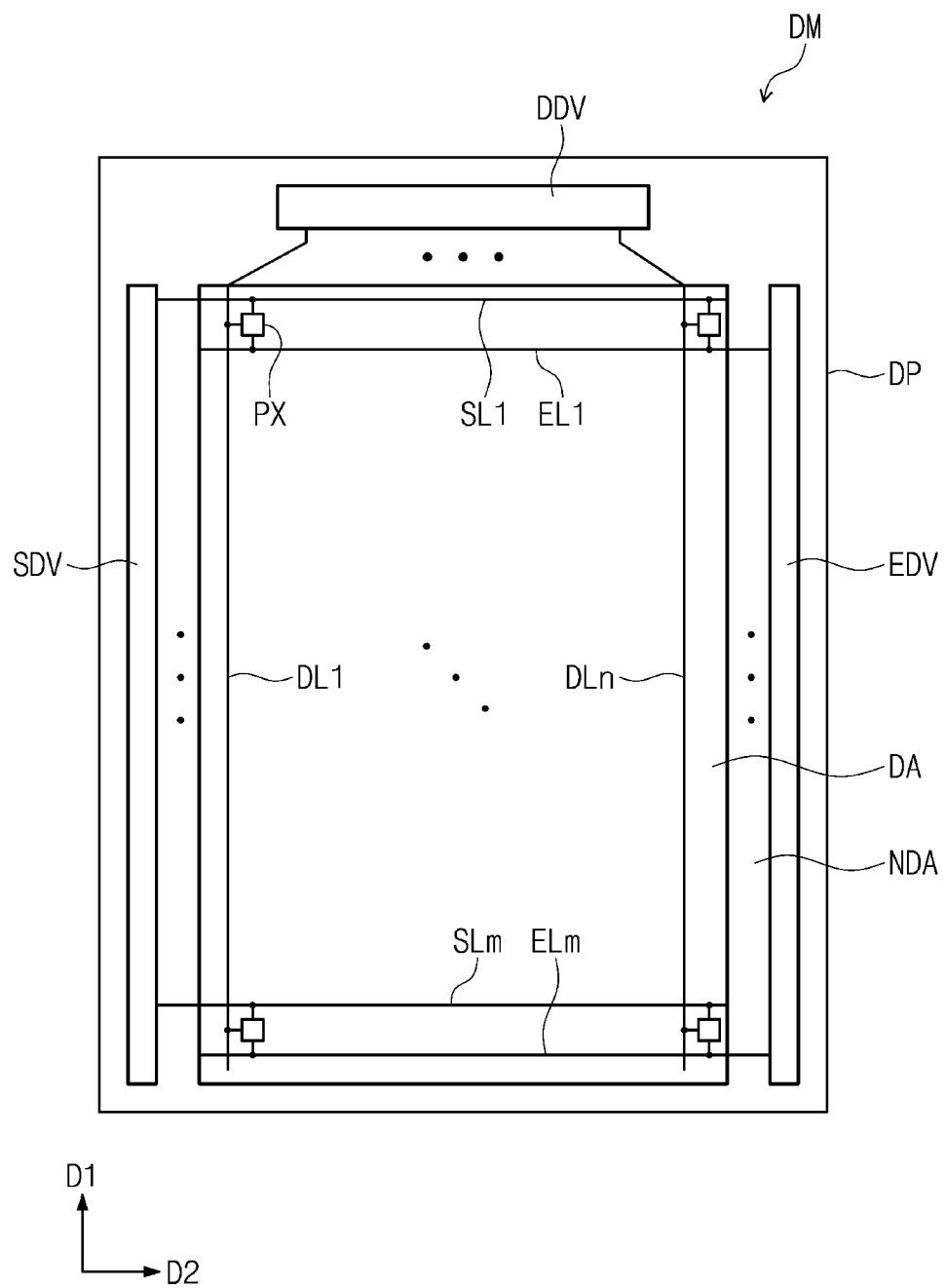
FIG. 5 is a plan view of the display module of FIG. 4.

FIG. 5 is a plan view of the display module of FIG. 4.

Referring to FIG. 5, the display module DM may include a display panel DP, a scan driver SDV, a data driver DDV, and an emission driver EDV. In FIG. 5, a planar shape of the display panel DP is schematically illustrated and a planar shape of the touch sensing part TSP is omitted.

The display panel DP may have substantially a rectangular shape having long sides in the first direction D1 and short sides in the second direction D2. The display panel DP may include a display area DA and a non-display area NDA surrounding the display area DA, as in the display surface DS.

The display panel DP may include a plurality of pixels PX, a plurality of scan lines SL1 to SLm, a plurality of data lines DL1 to DLn, and a plurality of emission lines EL1 to ELm, in which m and n are natural numbers. The pixels PX may be disposed on the display area DA and connected to the scan lines SL1 to SLm, the data lines DL1 to DLn, and the emission lines EL1 to ELm.

The scan driver SDV, the data driver DDV, and the emission driver EDV may be disposed on the non-display area NDA. The scan driver SDV and the data driver DDV may be disposed on the non-display areas that are adjacent to long sides of the display panel DP, respectively. The data driver DDV may be manufactured in the form of an integrated circuit chip and disposed on the non-display area NDA that is adjacent to any one of the short sides of the display panel DP.

The scan lines SL1 to SLm may extend in the second direction D2 and be connected to the scan driver SDV. The data lines DL1 to DLn may extend in the first direction D1 and be connected to the data driver DDV. The emission lines EL1 to ELm may extend in the second direction D2 and be connected to a gate driver EDV.

The scan driver SDV may generate a plurality of scan signals, and the scan signals may be applied to the pixels PX through the scan lines SL1 to SLm. The scan signals may be sequentially applied to the pixel PX. The data driver DDV may generate a plurality of data voltages, and the data voltages may be applied to the pixels PX through the data lines DL1 to DLn. The emission driver EDV may generate a plurality of emission signals, and the emission signals may be applied to the pixels PX through the emission lines EL1 to ELm.

The display module DM may also include a timing controller that controls the operations of the scan driver SDV, the data driver DDV, and the emission driver EDV.

The pixels PX may receive the data voltages in response to the scan signals. The pixels PX may emit light having luminance corresponding to the data voltages in response to the emission signals to display an image. An emission time of the pixels PX may be controlled by the emission signals.

Figure 6:
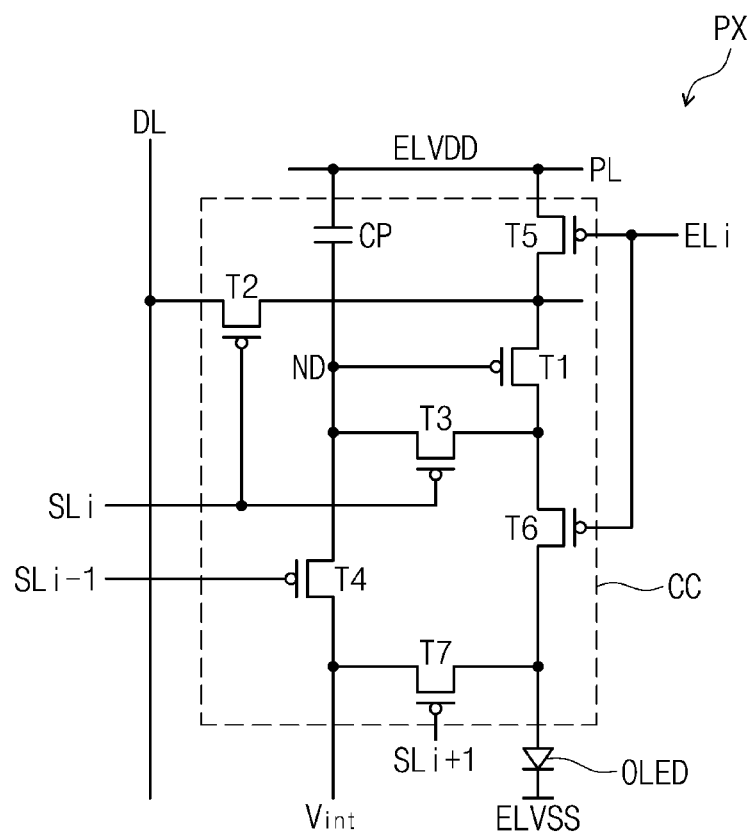
FIG. 6 is a diagram of an equivalent circuit of a pixel of FIG. 5 according to an exemplary embodiment.

FIG. 6 is a diagram of an equivalent circuit of a pixel of FIG. 5 according to an exemplary embodiment.

Referring to FIG. 6, the pixel PX may include a light emitting element OLED and a pixel circuit CC. The light emitting element OLED may be an organic light emitting element. The pixel circuit CC may include a plurality of transistors T1 to T7 and a capacitor CP. The pixel circuit CC may control an amount of current flowing to the light emitting element OLED according to the data voltage.

The light emitting element OLED may emit light having predetermined luminance corresponding to an amount of current supplied from the pixel circuit CC. As such, a first voltage ELVDD may be set to a level greater than that of the second voltage ELVSS.

Each of the transistors T1 to T7 may include an input electrode (or a source electrode), an output electrode (or a drain electrode), and a control electrode (or a gate electrode). Hereinafter, either the input electrode or the output electrode may be referred to as a first electrode and the other may be referred to as a second electrode.

The first electrode of the first transistor T1 may be connected to a power line PL, which applies the first voltage ELVDD, via the fifth transistor T5, and the second electrode may be connected to an anode electrode the light emitting element OLED via the sixth transistor T6. The first transistor T1 may be a driving transistor. The first transistor T1 may control an amount of current flowing to the light emitting element OLED according to the voltage applied to the control electrode of the first transistor T1.

The second transistor T2 may be connected between the data line DL and the first electrode of the first transistor T1, and the control electrode of the second transistor T2 may be connected to an $i^{th}$ scan line SLi. The second transistor T2 may receive an $i^{th}$ scan signal Si from the $i^{th}$ scan line SLi to be turned on, so that the data line DL and the first electrode of the first transistor T1 are electrically connected to each other.

The third transistor T3 may be connected between the second electrode and the control electrode of the first transistor T1. The control electrode of the third transistor T3 may be connected to the $i^{th}$ scan line SLi. The third transistor T3 may receive the $i^{th}$ scan signal Si from the $i^{th}$ scan line SLi to be turned on, so that the second electrode and the control electrode of the first transistor T1 are electrically connected to each other. When the third transistor T3 is turned on, the first transistor T1 may be connected in the form of a diode.

The fourth transistor T4 is connected between a node ND and an initialization power generation unit. The control electrode of the fourth transistor T4 may be connected to an $(i-1)^{th}$ scan line SLi-1. The fourth transistor T4 may receive an $(i-1)^{th}$ scan signal from an $(i-1)^{th}$ scan line SLi-1 to be turned on, so that an initial voltage Vint is applied to the node ND.

The fifth transistor T5 may be connected between the power line PL and the first electrode of the first transistor T1. The control electrode of the fifth transistor T5 may be connected to an $i^{th}$ emission line ELi.

The sixth transistor T6 may be connected between the second electrode of the first transistor T1 and the anode electrode of the light emitting element OLED. The control electrode of the sixth transistor T6 may be connected to the $i^{th}$ emission line ELi.

The seventh transistor T7 may be connected between the initialization power generation unit and the anode electrode of the light emitting element OLED. The control electrode of the seventh transistor T7 is connected to an $(i+1)^{th}$ scan line SLi+1. The seventh transistor T7 may receive an $(i+1)^{th}$ scan signal from an $(i+1)^{th}$ scan line SLi+1 to be turned on, so that the initial voltage Vint is applied to the anode electrode of the light emitting element OLED.

When the seventh transistor T7 is turned on, a parasitic capacitor of the light emitting element OLED may be discharged. As such, when black luminance of the pixel PX is implemented, the light emitting element OLED may not emit light by current leaked from the first transistor T1, thereby improving black expression capability of the pixel PX.

Although FIG. 6 illustrates a circuit diagram having a PMOS structure, the inventive concepts are not limited thereto. For example, in some exemplary embodiments, the pixel PX may be formed by an NMOS or a combination of the NMOS and the PMOS.

The capacitor CP may be disposed between the power line PL and the node ND. The capacitor CP may store the data voltage. When the fifth transistor T5 and the sixth transistor T6 are turned on according to the voltage stored in the capacitor CP, an amount of current flowing through the first transistor T1 may be determined.

Figure 7:
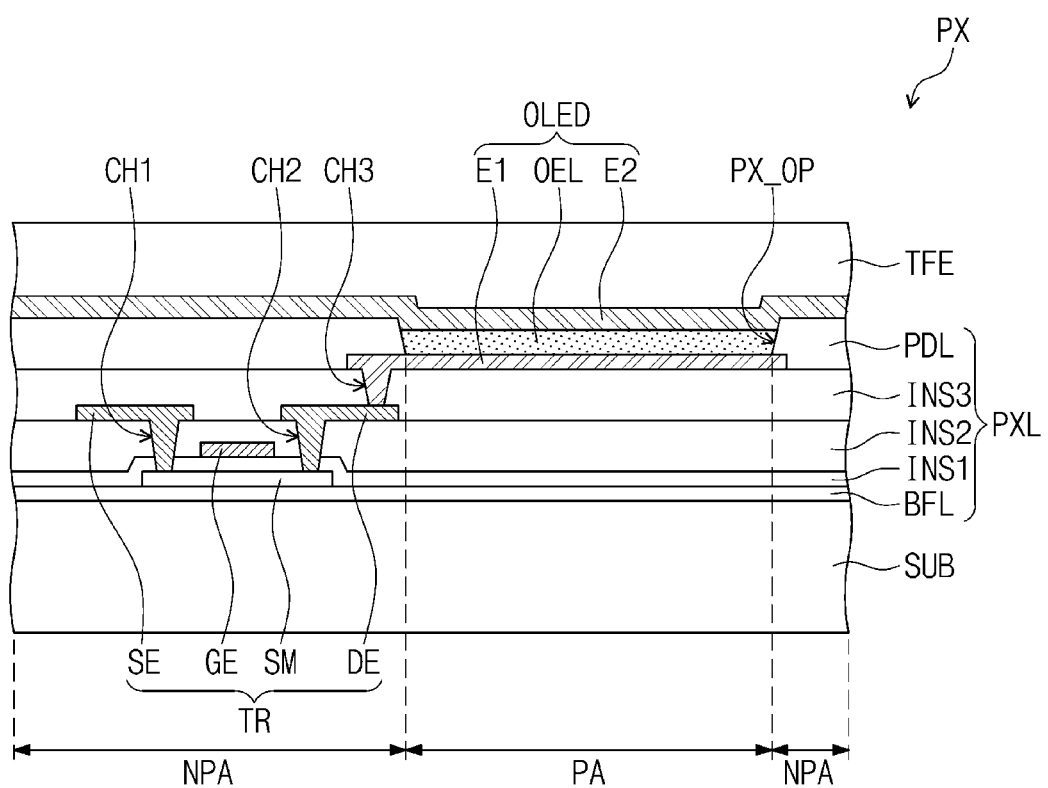
FIG. 7 is a cross-sectional view of a portion corresponding to a light emitting element of FIG. 4.

FIG. 7 is a cross-sectional view of a portion of the light emitting element of FIG. 4.

Referring to FIG. 7, the pixel PX may include the light emitting element OLED and the transistor TR connected to the light emitting element OLED. The light emitting element OLED may include a first electrode E1, a second electrode E2, and an organic emission layer OEL disposed between the first electrode E1 and the second electrode E2. The transistor TR may be the sixth transistor T6 of FIG. 5.

The first electrode E1 may be an anode electrode, and the second electrode E2 may be a cathode electrode. The first electrode E1 may be defined as a pixel electrode, and the second electrode E2 may be defined as a common electrode.

The pixel PX may be divided into a pixel area PA and a non-pixel area NPA around the pixel area PA. The light emitting element OLED may be disposed on the pixel area PA, and the transistor TR may be disposed on the non-pixel area NPA.

The transistor TR and the light emitting element OLED may be disposed on the substrate SUB. A buffer layer BFL may be disposed on the substrate SUB, and the buffer layer may include an inorganic material.

The semiconductor layer SM of the transistor TR may be disposed on the buffer layer BFL. The semiconductor layer SM may include a semiconductor or an organic semiconductor including an inorganic material, such as amorphous silicon or polycrystalline silicon. In some exemplary embodiments, the semiconductor layer SM may include an oxide semiconductor. The semiconductor layer SM may include a source region, a drain region, and a channel region between the source region and the drain region.

A first insulation layer INS1 may be disposed on the buffer layer BFL to cover the semiconductor layer SM. The first insulation layer INS1 may include an inorganic material. A gate electrode GE of the transistor TR overlapping the semiconductor layer SM may be disposed on the first insulation layer INS1. The gate electrode GE may be disposed to overlap the channel region of the semiconductor layer SM.

A second insulation layer INS2 may be disposed on the first insulation layer INS1 to cover the gate electrode GE. The second insulation layer INS2 may be defined as an interlayer dielectric. The second insulation layer INS2 may include an organic material and/or an inorganic material.

The source electrode SE and the drain electrode DE of the transistor TR may be disposed to be spaced apart from each other on the second insulation layer INS2. The source electrode SE may be connected to the source region of the semiconductor layer SM through a first contact hole CH1 passing through the first and second insulation layers INS1 and INS2. The drain electrode DE may be connected to the drain region of the semiconductor layer SM through a second contact hole CH2 passing through the first and second insulation layers INS1 and INS2.

A third insulation layer INS3 may be disposed on the second insulation layer INS2 to cover the source and drain electrodes SE and DE of the transistor TR. The third insulation layer INS3 may be defined as a planarization layer that provides a flat top surface, and may include an organic material.

The first electrode E1 may be disposed on the third insulation layer INS3. The first electrode E1 may be connected to the drain electrode DE of the transistor TR through a third contact hole H3 passing through the third insulation layer INS3.

A pixel define layer PDL, through which a predetermined area of the first electrode E1 is exposed, may be disposed on the first electrode E1 and the third insulation layer INS3. An opening PX_OP, through which a predetermined portion of the first electrode E1 is exposed, may be defined in the pixel define layer PDL.

An organic emission layer OEL may be disposed on the first electrode E1 within the opening PX_OP. The organic emission layer OEL may emit one of red light, green light, and blue light, for example. However, the inventive concepts are not limited thereto. For example, in some exemplary embodiments, the organic emission layer may generate white light by the combination of organic materials that respectively generate red, green, and blue light.

The second electrode may be disposed on the pixel define layer PDL and the organic light emitting layer OEL. The thin film encapsulation layer TFE may be disposed on the light emitting element OLED to cover the pixel PX. A layer between the substrate SUB and the thin film encapsulation layer TFE may be defined as the pixel layer PXL.

The first voltage ELVDD may be applied to the first electrode E1, and the second voltage ELVSS may be applied to the second electrode E2. Holes and electrons injected into the organic emission layer OEL may be coupled to each other to form exciton. When the exciton transitions to a ground state, the light emitting element OLED may emit light. The light emitting element OLED may emit red, green, or blue light, for example, according to a flow of current and display an image.

Figure 8:
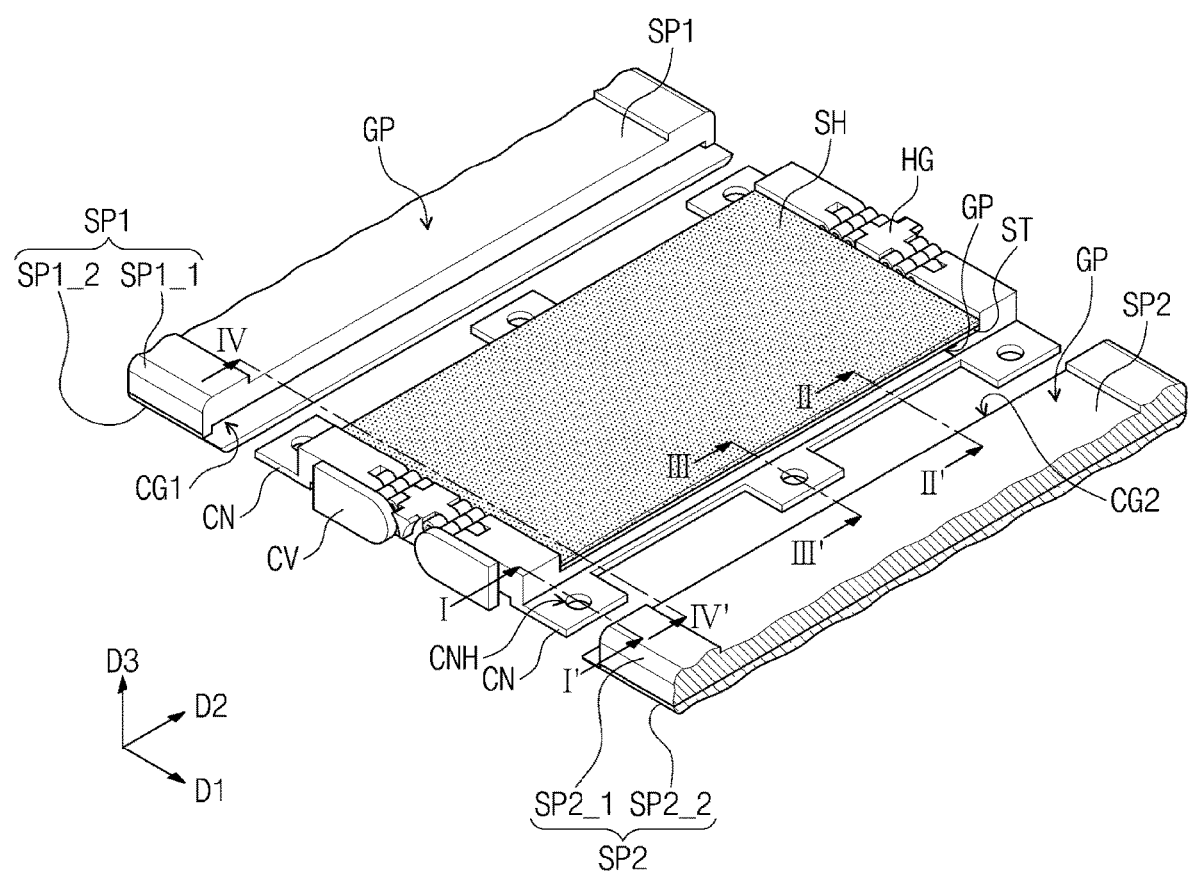
FIG. 8 is an exploded perspective view of a support part of FIG. 3.

FIG. 8 is an exploded perspective view of the support part of FIG. 3.

FIG. 8 illustrates a state, in which the hinge part HG and the first and second support parts SP1 and SP2 are disassembled.

Referring to FIG. 8, the hinge part HG may be disposed between the first support part SP1 and the second support part SP2, and the groove part GP may be defined in each of the first support part SP1, the second support part SP2, and the hinge part HG. The hinge part HG may extend longer in the second direction D2 than the first direction D1. Both sides of the hinge part HG, which are opposite to each other in the second direction D2, may be disposed higher than the groove part GP of the hinge part HG.

The hinge part HG may include a plurality of connection parts CN extending in the first direction D1 from both sides of the hinge part HG, which are opposite to each other in the first direction D1. The connection parts CN may extend toward the first support part SP1 and the second support part SP2. A connection hole CNH may be defined in each of the connection parts CN.

A first connection groove CG1 may be defined in one side of the first support part SP1 facing one side of the hinge part HG. A second connection groove CG2 may be defined in one side of the second support part SP2 facing the other side of the hinge part HG. Both sides of the hinge part HG and the connection parts CN may be inserted into the first and second connection grooves CG1 and CG2 so as to be connected to the first and second support parts SP1 and SP2. The first support part SP1 may have a shape substantially symmetrical to that of the second support part SP2.

The first support part SP1 may include a first sub-support part SP1_1 and a second sub-support part SP1_2 disposed below the first sub-support part SP1_1. The first connection groove CG1 may be defined between the first sub-support part SP1_1 and the second sub-support part SP1_2.

The second support part SP2 may include a third sub-support part SP2_1 and a fourth sub-support part SP2_2 disposed below the third sub-support part SP2_1. The second connection groove CG2 may be defined between the third sub-support part SP2_1 and the fourth sub-support part SP2_2.

The support plate ST may be disposed in the groove part GP of the hinge part HG, and the sheet part SH may be disposed on the support plate ST. The configurations of the support plate ST and the sheet part SH will be described in more detail below.

Figure 9:
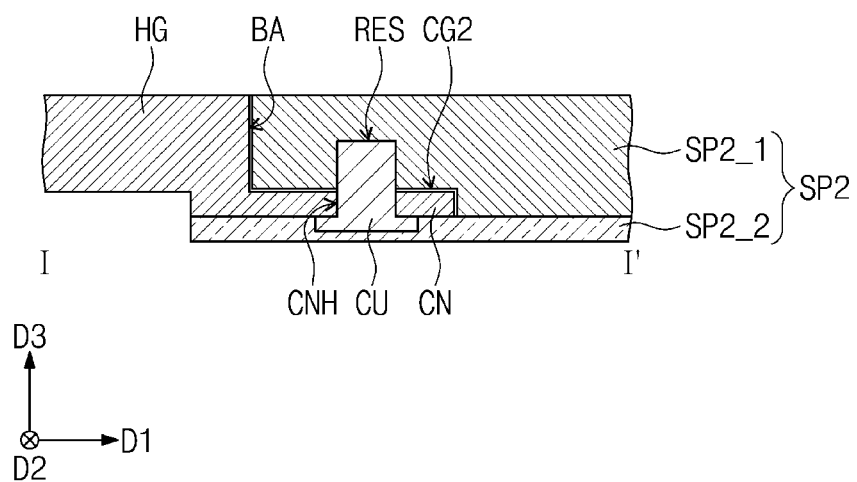
FIG. 9 is a cross-sectional view taken along line I-I' of FIG. 8.
Figure 10:
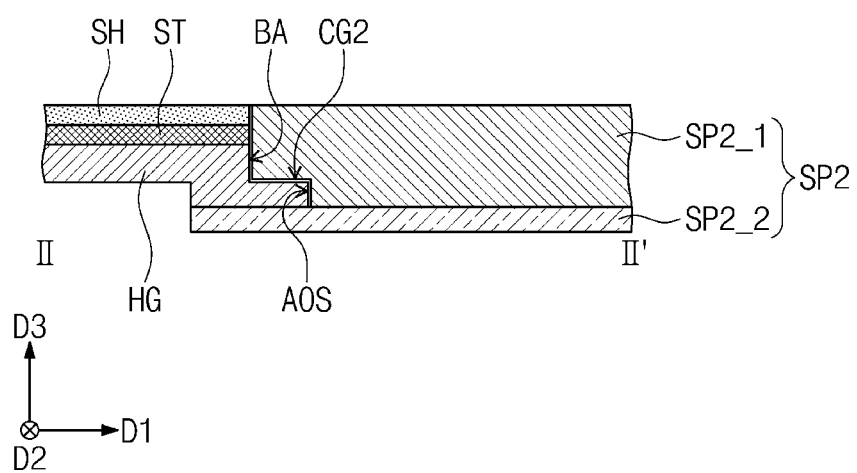
FIG. 10 is a cross-sectional view taken along line II-II' of FIG. 8.
Figure 11:
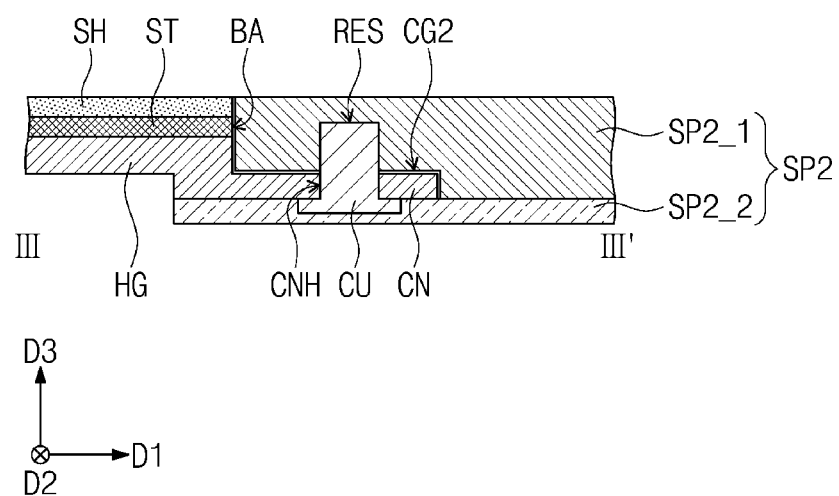
FIG. 11 is a cross-sectional view taken along line III-III' of FIG. 8.

FIG. 9 is a cross-sectional view taken along line I-I' of FIG. 8. FIG. 10 is a cross-sectional view taken along line II-II' of FIG. 8. FIG. 11 is a cross-sectional view taken along line III-III' of FIG. 8.

FIGS. 9, 10, and 11 illustrate cross-sectional views of the hinge part HG and the second support part SP2 when the hinge part HG and the second support part SP2 are connected to each other.

Referring to FIGS. 9, 10, and 11, the other side AOS of the hinge part HG, which is adjacent to the second support part SP2, and the connection parts CN extending from the other side AOS of the hinge part HG may be disposed in the second connection groove CG2. The other side AOS of the hinge part HG and the connection parts CN may be inserted into the second connection groove CG2, and the hinge part HG may be connected to the second support part SP2.

More particularly, recess parts RES overlapping the connection holes CNH may be defined in a lower portion of the third sub-support part SP2_1. The second connection groove CG2 may be defined in a bottom surface of the third sub-support part SP2_1 adjacent to one side of the third sub-support part Sp2_1. One side of the third sub-support part SP2_1 may be adjacent to the other side AOS of the hinge part HG.

The other side AOS of the hinge part HG and the connection parts CN may be inserted into the second connection groove CG2, and the plurality of coupling units CU may be inserted into the connection holes CNH and the recess parts RES to connect the hinge part HG to the third sub-support part SP2_1. Thereafter, a fourth sub-support part SP2_2 may be disposed below the other side AOS of the hinge part HG, below the connection parts CN, and below the third sub-support part SP2_1.

The fourth sub-support part SP2_2 may be connected to the third sub-support part SP2_1 to cover a lower portion of the other side of the hinge part HG, lower portions of the connection parts CN, and lower portions of the coupling units CU. The fourth sub-support part SP2_2 may extend up to a predetermined portion of the hinge part HG, which is adjacent to the other side AOS of the hinge part HG.

A top surface of the portion of the hinge part HG, which is adjacent to the other side AOS of the hinge part HG, may a stepped structure (e.g., a stair shape). A boundary BA of the stepped structure may be defined as a boundary between two portions of the top surface of the hinge part HG having heights different from each other. One side of the third sub-support part SP2_1 may be adjacent to the boundary BA of the stepped structure.

The hinge part HG and the first support part SP1 may be connected to each other in substantially the same manner as that of the hinge part HG and the second support part SP2. Also, the shapes of one side of the hinge part HG and the first and second sub-support parts Sp1_1 and Sp1_2 may to be symmetrical to and substantially the same as those of the other side of the hinge part HG and the third and fourth sub-support parts SP2_1 and SP2_2, as illustrated in FIGS. 9 to 11.

Figure 12:
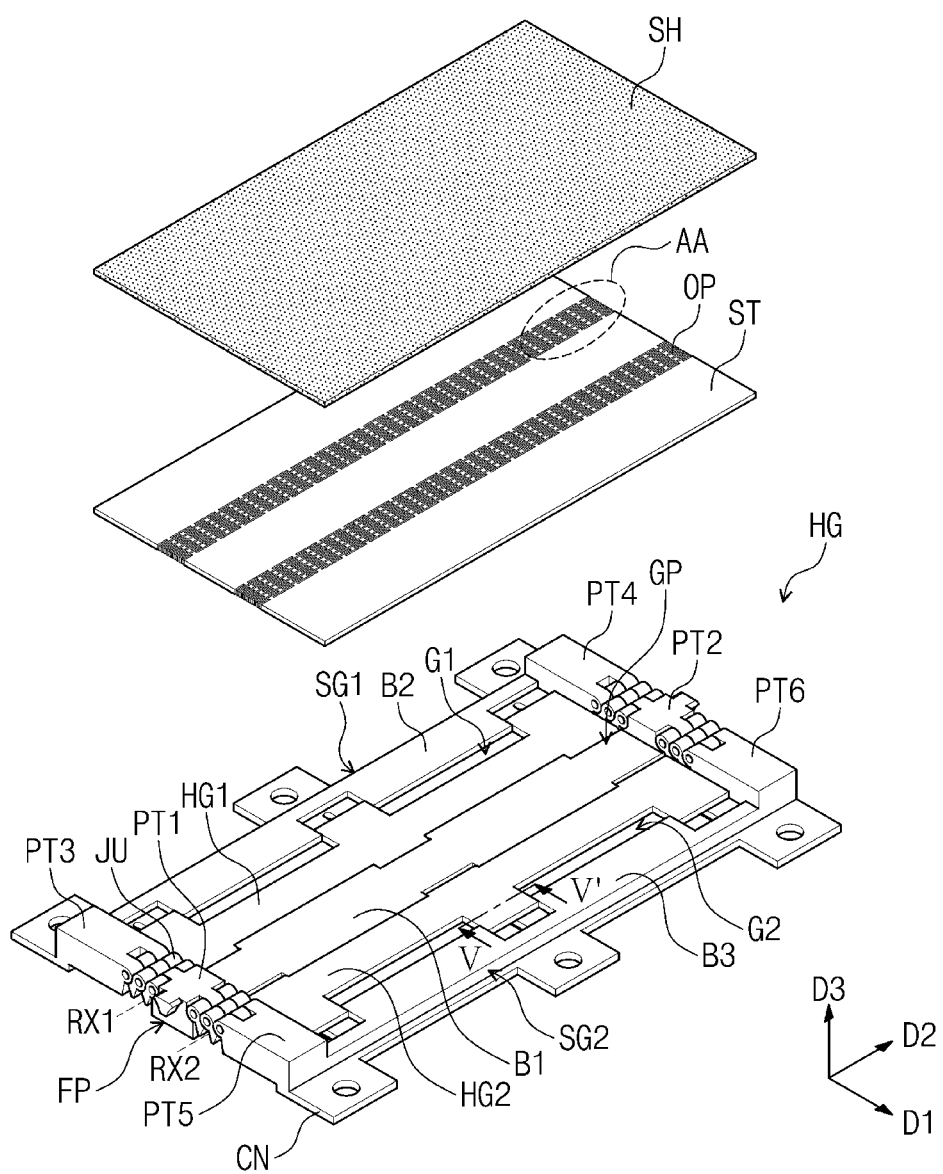
FIG. 12 is an exploded perspective view of a hinge part, a supply plate, and a sheet part of FIG. 8.
Figure 13:
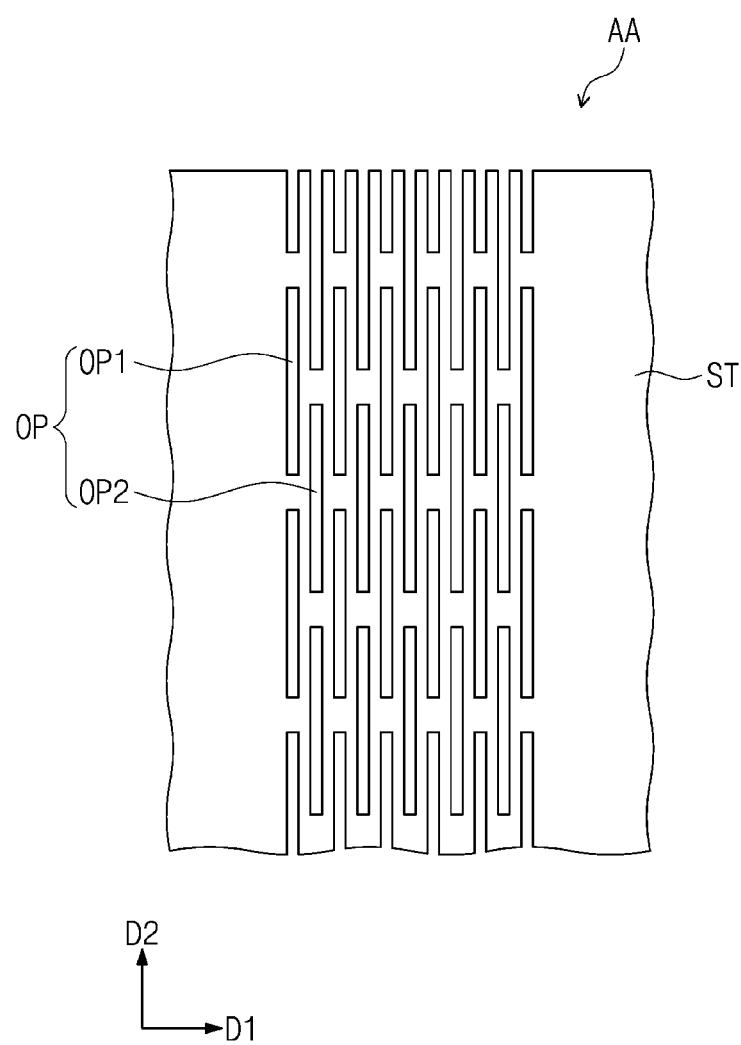
FIG. 13 is an enlarged view of an area AA of FIG. 12.
Figure 14:
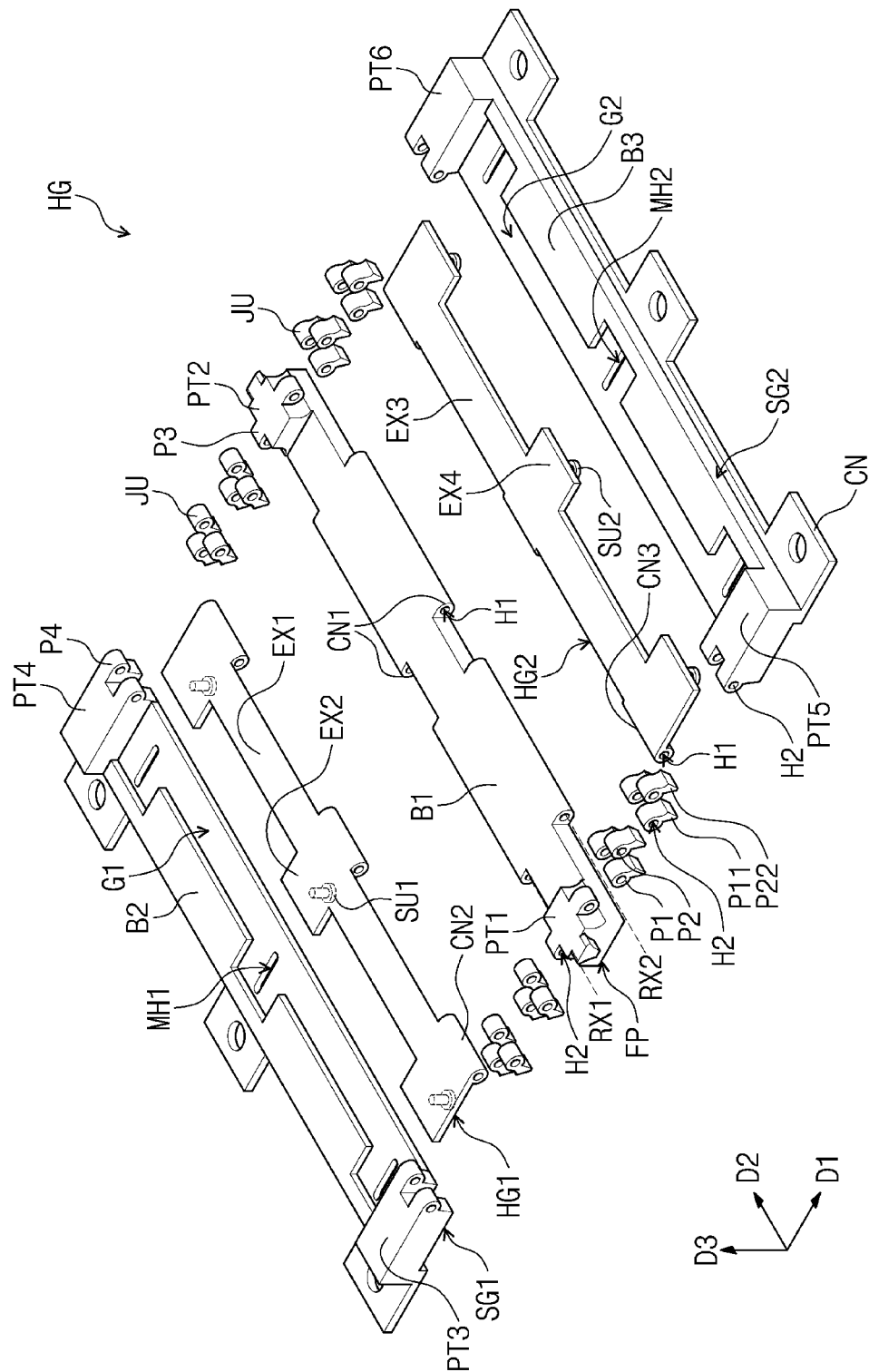
FIG. 14 is an exploded perspective view of the hinge part of FIG. 12.

FIG. 12 is an exploded perspective view of the hinge part, the supply plate, and the sheet part of FIG. 8. FIG. 13 is an enlarged view of an area AA of FIG. 12. FIG. 14 is an exploded perspective view of the hinge part of FIG. 12.

Referring to FIG. 12, the support plate ST and the sheet part SH may be disposed on the hinge part HG. The support plate ST may be disposed between the sheet part SH and the hinge part HG. The support plate ST and the sheet part SH may be disposed on the groove part GP of the hinge part HG.

Each of the support plate ST and the sheet part SH may have substantially a rectangular shape having short sides in the first direction D1 and long sides in the second direction D2. The support plate ST may include metal, and the sheet SH may include a flexible material, such as rubber, for example.

A plurality of openings OP may be defined in the support plate ST. When viewed in a plane, the openings OP may overlap a portion of the hinge part HG.

Referring to FIG. 13, the openings OP may be defined by removing portions of the support plate ST. The opening OP may extend in the second direction D2. The openings OP may arranged in the first direction D1 and the second direction D2.

The openings OP may include a plurality of first openings OP1 arranged in the first direction D1 and the second direction D2, and a plurality of second openings OP2 arranged in the first direction D1 and the second direction D2. The second openings OP2 may be disposed between the first opening OP1 in the first direction D1. The second openings OP2 and the first openings OP1 may not entirely overlap in the first direction D1.

Referring to FIG. 12, the hinge part HG may include a fixed part FP, a first hinge HG1, a second hinge HG2, a first sub-hinge SG1, a second sub-hinge SG2, a plurality of joint units JU. The fixed part FP may extend in the second direction D2. The first hinge HG1 and the second hinge HG2 may be connected to both sides of the fixed part FP, which are opposite to each other in the first direction D1.

In FIG. 12, the cover parts CV are not shown to illustrate the joint units JU. The cover parts CV may be substantially connected to the first and second sub-hinges SG1 and SG2.

The first hinge HG1 may be rotatably connected to one side of the fixed part FP among both sides of the fixed part FP, which are opposite to each other in the first direction D1. One side of the fixed part FP may substantially face the first support part SP1 of FIG. 8. The second hinge HG2 may be rotatably connected to the other side of the fixed part FP among both sides of the fixed part FP, which are opposite to each other in the first direction D1. The other side of the fixed part FP may substantially face the second support part SP2 of FIG. 8.

The first hinge HG1 may rotate about the first rotation axis RX1, which is defined at one side of the fixed part FP to extend in the second direction D2. The second hinge HG2 may rotate about the second rotation axis RX2, which is defined at the other side of the fixed part FP to extend in the second direction D2. The above-described configuration will be described in more detail with reference to FIG. 14. The openings OP may overlap the first rotation axis RX1 and the second rotation axis RX2.

The first hinge HG1 may be disposed between the fixed part FP and the first sub-hinge SG1, and the first sub-hinge SG1 may be connected to the first hinge HG1. The second hinge HG2 may be disposed between the fixed part FP and the second sub-hinge SG2, and the second sub-hinge SG2 may be connected to the second hinge HG2.

The connection parts CN may extend from the first and second sub-hinges SG1 and SG2. One side of each of the first and second sub-hinges SG1 and SG2 may define both sides of the hinge part HG, which are opposite to each other in the first direction D1.

The first sub-hinge SG1 may be connected to the first support part SP1 through the connection parts CN extending from one side of the first sub-hinge SG1. The second sub-hinge SG2 may be connected to the second support part SP2 through the connection parts CN extending from one side of the second sub-hinge SG2.

The groove part GP may be defined in the fixed part FP and the first and second sub-hinges SG1 and SG2. The joint units JU may be disposed between portions of the fixed part FP and the first and second sub-hinges SG1 and SG2, except for the groove part GP.

More particularly, the fixed part FP may include a first portion PT1, a second portion PT2, and a first body part B1 between the first portion PT1 and the second portion PT2. The first portion PT1 and the second portion PT2 are respectively defined as portions of the fixed part FP, which are adjacent to both sides of the fixed part FP and opposite to each other in the second direction D2. The first body part B1 may extend in the second direction D2.

The first sub-hinge SG1 may include a third portion PT3, a fourth portion PT4, and a second body part B2 between the third portion PT3 and the fourth portion PT4. The third portion PT3 and the fourth portion PT4 are defined as portion of the first sub-hinge SG1, which is are adjacent to both sides of the first sub-hinge SG1 and are opposite to each other in the second direction D2. The second body part B2 may extend in the second direction D2.

The second sub-hinge SG2 may include a fifth portion PT5, a sixth portion PT6, and a third body part B3 disposed between the fifth portion PT5 and the sixth portion PT6. The fifth portion PT5 and the sixth portion PT5 are respectively defined as portions of the second sub-hinge SG2, which are adjacent to both sides of the second sub-hinge SG2 and are opposite to each other in the second direction D2. The third body part B3 may extend in the second direction D2.

The first portion PT1 may be disposed between the third portion PT3 and the fifth portion PT5. The second portion PT2 may be disposed between the fourth portion PT4 and the sixth portion PT6. The joint units JU may be disposed between the first portion PT1 and the third portion PT3, between the first portion PT1 and the fifth portion PT5, between the second portion PT2 and the fourth portion PT4, and between the second portion PT2 and the sixth portion PT6, respectively.

The fixed part FP and the first and second sub-hinges SG1 and SG2 may be rotatably coupled to each other by the joint units JU. The joint units JU may be rotatably coupled to the first portion PT1 and the third portion PT3, the first portion PT1 and the fifth portion PT5, the second portion PT2 and the fourth portion PT4, and the second portion PT2 and the sixth portion PT6.

The first, second, and third body parts B1, B2, and B3 may be disposed lower than the first to sixth portions PT1 to PT6. As such, the groove part GP of the hinge part HG may be defined between the first portion PT1 and the second portion PT2, between the third portion PT3 and the fourth portion PT4, and between the fifth portion PT5 and the sixth portion PT6.

The support plate ST and the sheet part SH may be disposed on the first, second, and third body parts B1, B2, and B3. The folding area FA may also be disposed on the first, second, and third body parts B1, B2, and B3. The first and second hinges HG1 and HG2 may be disposed between the third portion PT3 and the fourth portion PT4, and between the fifth portion PT5 and the sixth portion PT6, respectively.

Referring to FIGS. 12 and 14, the hinge part HG may include a plurality of first connection parts CN1, a plurality of second connection parts CN2, and a plurality of third connection parts CN3. The first connection parts CN1 may be disposed on both sides of the fixed part FP, which are opposite to each other in the first direction D1 to extend in the second direction D2. The portion at which the first connection parts CN1 are disposed may be the first body part B1 of the fixed part FP.

The second connection parts CN2 may be disposed on one side of the first hinge HG1, which faces one side of the fixed part FP, to extend in the second direction D2. The third connection parts CN3 may be disposed on one side of the second hinge HG2, which faces the other side of the fixed part FP, to extend in the second direction D2. Each of the first, second, and third connection parts CN1, CN2, and CN3 may have substantially a cylindrical shape extending the second direction D2.

First holes H1 extending in the second direction D2 may be defined in the first, second, and third connection parts CN1, CN2, and CN3, respectively. Each of the first holes H1 may have substantially a cylindrical shape extending in the second direction D2.

The second connection parts CN2 may be disposed between the first connection parts CN1 disposed on one side of the fixed part FP. The third connection parts CN3 may be disposed between the first connection parts CN1 disposed on the other side of the fixed part FP.

The second connection parts CN2 may be rotatably coupled to the first connection parts CN1, and the third connection parts CN3 may be rotatably coupled to the first connection parts CN1. For example, the second and third connection parts CN2 and CN3 may be disposed between the first connection parts CN1, and pin units may be inserted into the first holes H1. In this manner, the second and third connection parts CN2 and CN3 may be rotatably coupled to the first connection parts CN1.

The first and second rotation axes RX1 and RX2 may be defined on portions at which the first connection parts CN1 are disposed. When viewed in the second direction D2, central portions of the first connection parts CN1 disposed on one side of the fixed part FP may be defined as the first rotation axis RX1, and central portions of the first connection parts CN1 disposed on the other side of the fixed part FP may be defined as the second rotation axis RX2. As such, the first hinge HG1 and the second hinge HG2 may rotate about the first rotation axis RX1 and the second rotation axis RX2, respectively.

The first hinge HG1 may include a first extension part EX1 extending in the second direction D2, and a plurality of second extension parts EX2 extending from the first extension part EX1 in the first direction D1. The second extension part EX2 may extend from the other side of the first extension part EX1, which is opposite to one side of the first extension part EX1 facing the fixed part FP.

The second hinge HG2 may include a third extension part EX3 extending in the second direction D2, and a plurality of fourth extension parts EX4 extending from the third extension part EX3 in the first direction D1. The fourth extension part EX4 may extend from the other side of the third extension part EX3, which is opposite to one side of the third extension part EX3 facing the fixed part FP.

The first extension part EX1 and the second extension parts EX2 may be disposed in a first groove G1 defined in the top surface of the first sub-hinge SG1. The first groove G1 may be substantially defined in a top surface of the second body part B2. The first groove G1 may have a shape corresponding to each of the first extension part EX1 and the second extension parts EX2.

The third extension part EX3 and the fourth extension parts EX4 may be disposed in a second groove G2 defined in the top surface of the second sub-hinge SG2. The second groove G2 may be substantially defined in a top surface of the third body part B3. The second groove G2 may have a shape corresponding to each of the third extension part EX3 and the fourth extension parts EX4.

The hinge part HG may include a plurality of first sliding units SU1 connected to the lower portion of the first hinge HG1, and a plurality of second sliding units SU2 connected to the lower portion of the second hinge HG2. In FIG. 14, each of the first sliding units SU1 are illustrated in a dotted line. The first sliding units SU1 may be connected to lower portions of the second extension parts EX2, and the second sliding unit SU2 may be connected to lower portions of the fourth extension parts Ex4.

The first sliding units SU1 may be disposed in a plurality of first moving holes MH1 defined in the first sub-hinge SG1 to extend in the first direction D1. The first moving holes MH1 may be substantially defined in portions of the first sub-hinge SG1, in which the first groove G1 is defined.

The second sliding units SU1 may be disposed in a plurality of second moving holes MH2 defined in the second sub-hinge SG2 to extend in the first direction D1. The second moving holes MH2 may be substantially defined in portions of the second sub-hinge SG2, in which the second groove G2 is defined.

The two joint units JU may be disposed between the first portion PT1 and the third portion PT3, between the first portion PT1 and the fifth portion PT5, between the second portion PT2 and the fourth portion PT4, and between the second portion PT2 and the sixth portion PT6. However, the inventive concepts are not limited to one particular number of joint units JU.

The joint units JU disposed between the first portion PT1 and the third portion PT3 may be symmetrical to and substantially the same as the joint units JU disposed between the first portion PT1 and the fifth portion PT5. Also, the joint units JU disposed between the second portion PT2 and the fourth portion PT4 may be symmetrical to and substantially the same as the joint units JU disposed between the second portion PT2 and the sixth portion PT6.

Each of the joint units JU disposed between the first portion PT1 and the third portion PT3 may have the same shape as each of the joint units JU disposed between the second portion PT2 and the fourth portion PT4. Also, each of the joint units JU disposed between the first portion PT1 and the fifth portion PT5 may have the same shape as each of the joint units JU disposed between the second portion PT2 and the sixth portion PT6. As such, configurations of the joint units JU will be described with reference to the joint units JU disposed between the first portion PT1 and the fifth portion PT5.

Each of the joint units JU may include a plurality of first protrusions P1 spaced apart from each other in the second direction D2, and a second protrusion P2 connected to right sides of the first protrusions P1 when viewed in the second direction D2. When viewed in the first direction D1, the second protrusion P2 may be disposed between the first protrusions P1. Each of the first and second protrusions P1 and P2 may have substantially a cylindrical shape extending in the second direction D2.

Although each of the joint units JU of FIG. 14 is described as including two first protrusions P1 and one second protrusion P2, however, the inventive concepts are not limited to particular numbers of the first and second protrusions P1 and P2. For example, in some exemplary embodiments, each of the joint units JU may include two or more first protrusions P1 and one or more second protrusions P2 disposed between the first protrusions P1.

Each of the joint units JU may include a first sub-protrusion P11 protruding downward from a right side of a lower end of each of the first protrusions P1, and a second sub-protrusion P12 protruding downward from a right side of a lower end of the second protrusion P2. When viewed in the second direction D2, each of the first and second sub-protrusions P11 and P12 may have an inverted trapezoidal shape. The second protrusion P2 and the second sub-protrusion P12 of an $H^{th}$ joint unit JU may be disposed between the first protrusions P1 and the first sub-protrusions P11 of an $(H+1)^{th}$ joint unit JU.

Third protrusions P3 may be disposed on both sides of the first portion PT1, which are opposite to each other in the first direction D1, and both sides of the second portion PT2, which are opposite to each other in the first direction D1, respectively. Each of the third protrusions P3 may have substantially a cylindrical shape extending in the second direction D2. Each of the third protrusions P3 may be disposed between the first protrusions P1 of the joint units JU adjacent to each other.

A plurality of fourth protrusions P4 may be disposed at one side of the third portion PT3 facing the first portion PT1, one side of the fifth portion PT5 facing the first portion PT1, one side of the fourth portion PT4 facing the second portion PT2, and one side of the sixth portion PT6 facing the second portion PT2, respectively. The fourth protrusions P4 may protrude from one side of the third portion PT3, one side of the fifth portion PT5, one side of the fourth portion PT4, and one side of the sixth portion PT6.

The second protrusion P2 of the joint unit JU, which is adjacent to each of the third to sixth portions PT3 to PT6, may be disposed between the fourth protrusions P4 of each of the third to sixth portions PT3 to PT6. Second holes H2 extending in the second direction D2 may be defined in the first, second, third, and fourth protrusions P1, P2, P3, and P4, and each of the second holes H2 may have substantially a cylindrical shape extending in the second direction D2.

The joint units JU may be rotatably coupled to each other. In addition, the joint units JU may be rotatably coupled to the first to sixth portions PT1 to PT6. For example, as described above, the joint units JU may be disposed on the first to sixth portions PT1 to PT6, and the pin units may be inserted into the second holes H2. In this manner, the joint units JU and the first to sixth portions PT1 to PT6 may be rotatably coupled to each other.

When the hinge part HG is flat, as illustrated in FIG. 12, the first and second extension parts EX1 and EX2 may be spaced apart from the boundary of the first groove G1, and the third and fourth extension parts EX3 and EX4 may be spaced apart from the boundary of the second groove G2.

Figure 15:
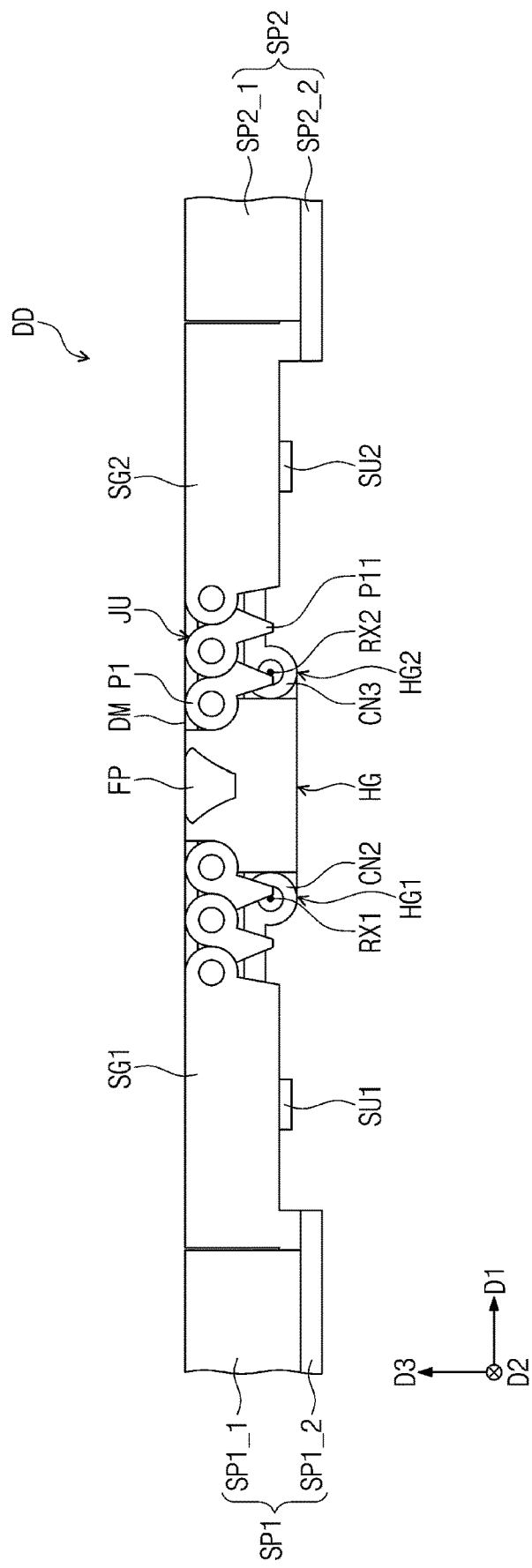
FIG. 15 is a side view of the display device when viewed in a second direction.
Figure 16:
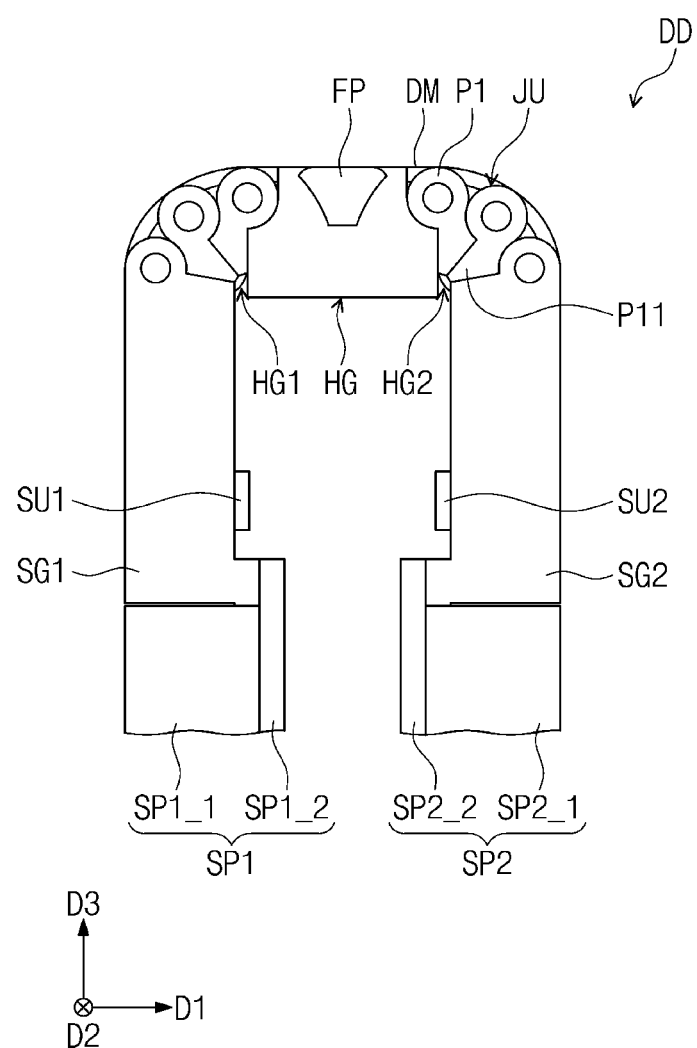
FIG. 16 is a view illustrating a folded state of the display device of FIG. 15.

FIG. 15 is a side view of the display device when viewed in the second direction. FIG. 16 is a view illustrating a folded state of the display device of FIG. 15.

In FIGS. 15 and 16, a portion of the first support part SP1 and a portion of the second support part SP2 are not illustrated.

Referring to FIG. 15, the display device DD may be in a flat state, and the second and third connection parts CN2 and CN3 may be connected to the first and second hinges HG1 and HG2. The first and second hinges HG1 and HG2 may be connected to the fixed part FP, and the joint units JU, which are connected to each other, may be connected to the fixed part FP and the first and second sub-hinges SG1 and SG2. The first and second sub-hinges SG1 and SG2 may be connected to the first and second support parts SP1 and SP2.

Referring to FIG. 16, the first and second hinges HG1 and HG2 may rotate about the first rotation axis RX1 and the second rotation axis RX2, and thus, the display device DD may be folded. The joint units JU may rotate, and side surfaces of first sub-protrusions P11 may be adjacent to contact each other. Similarly, side surfaces of the second sub-protrusions P12 may be adjacent to contact each other.

Figure 17:
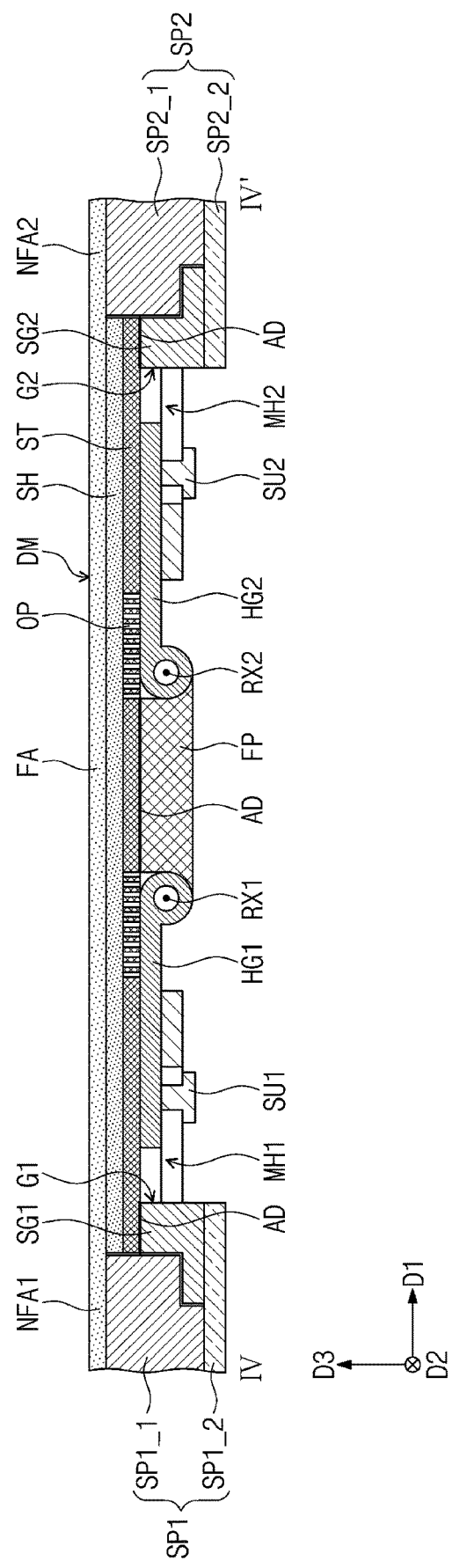
FIG. 17 is a cross-sectional view taken along line IV-IV' of FIG. 8.
Figure 18:
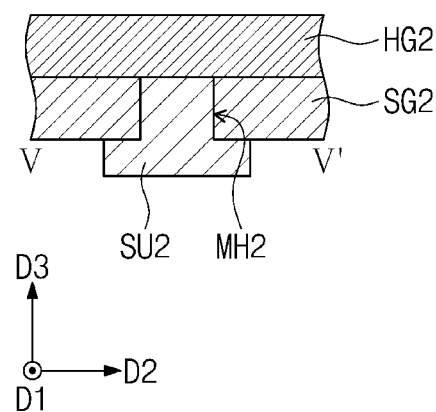
FIG. 18 is a cross-sectional view taken along line V-V' of FIG. 12.
Figure 19:
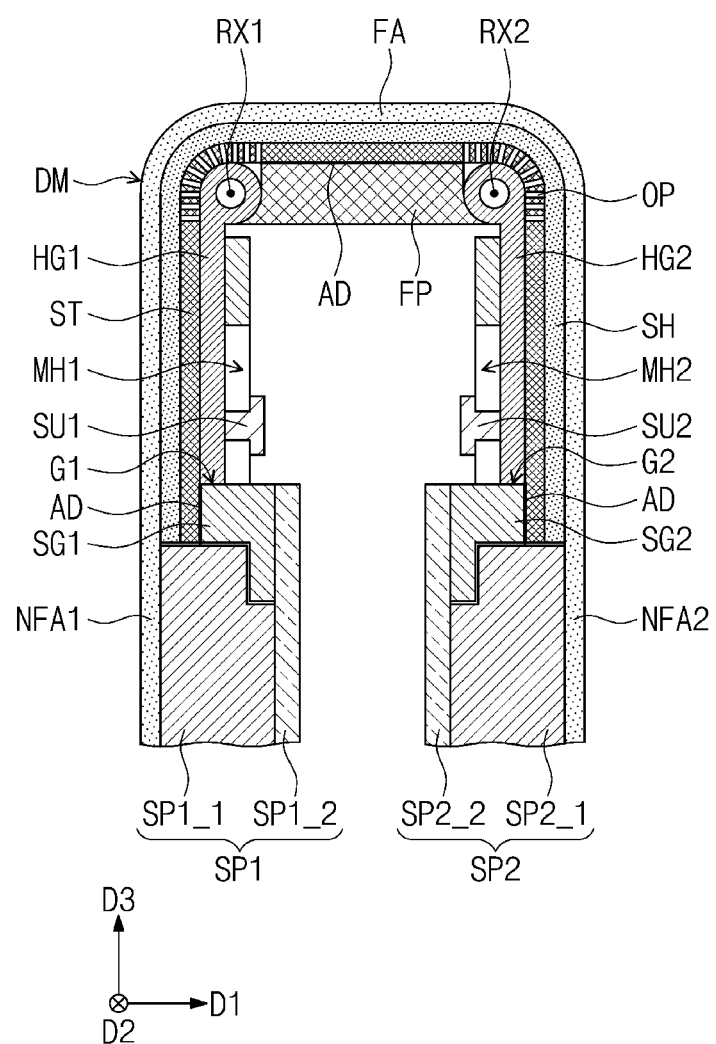
FIG. 19 is a view illustrating a folded state of the display device of FIG. 17.
Figure 20:
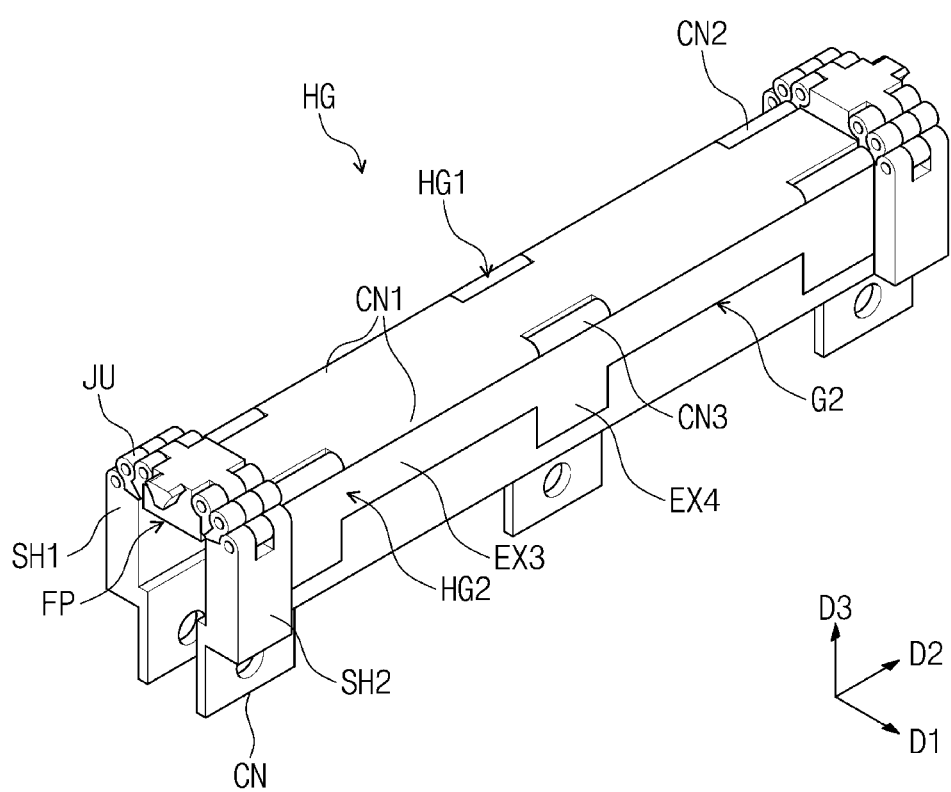
FIG. 20 is a perspective view of a folded hinge part.

FIG. 17 is a cross-sectional view taken along line IV-IV' of FIG. 8. FIG. 18 is a cross-sectional view taken along line V-V' of FIG. 12. FIG. 19 is a view illustrating a folded state of the display device of FIG. 17. FIG. 20 is a perspective view of the folded hinge part.

Referring to FIG. 17, the first and second sliding units SU1 and SU2 may be disposed in the first and second moving holes MH1 and MH2. The first and second sliding units SU1 and SU2 may extend further downward than portions of the first and second sub-hinges SG1 and SG2, in which the first and second grooves G1 and G2 are defined.

Referring to FIG. 18, a lower portion of the second sliding unit SU2, which is disposed below the second sub-hinge SG2, may have a width greater than that of the second moving hole MH2 in the second direction D2. In addition, a lower portion of the first sliding unit SU1, which is disposed below the first sub-hinge SG1, may have a width greater than that of the first moving hole MH1.

Referring back to FIG. 17, the support plate ST may be disposed on the fixed part FP, the first and second hinges HG1 and HG2, and the first and second sub-hinges SG1 and SG2. As described above, the openings Ops may overlap the first and second rotation axes RX1 and RX2.

The support plate ST may be attached to the first and second sub-hinges SG1 and SG2. For example, the adhesive AD may be disposed between the support plate ST and the fixed part FP, and between the support plate ST and the first and second sub-hinges SG1 and SG2. The support plate ST may be attached to the first and second sub-hinges SG1 and SG2 by the adhesive AD. In some exemplary embodiments, the support plate ST may not be attached to the first and second hinges HG1 and HG2.

The sheet part SH may be disposed on the support plate ST. The sheet part SH may be attached to the support plate ST by an adhesive, for example. The display module DM may be disposed on the sheet part SH. The display module DM may be disposed on the first and second support parts SP1 and SP2. The display module DM may be attached to the sheet part SH and the first and second support parts SP1 and SP2 by the adhesive, for example.

Referring to FIG. 19, the first and second hinges HG1 and HG2 may rotate about the first rotation axis RX1 and the second rotation axis RX2, and thus, the display device DD may be folded. The display device DD may be out-folded so that the display module DM is exposed to the outside.

When the display device DD is folded, the first and second hinges HG1 and HG2 may move toward the first and second support parts SP1 and SP2. For example, the first and second sliding units SU1 and SU2 may move toward the first and second support parts SP1 and SP2 along the first and second moving holes MH1 and MH2. When the display device DD is folded, the first and second sub-hinges SG1 and SG2 connected to the support plate ST and the first and second support parts SP1 and SP2 connected to the first and second sub-hinges SG1 and SG2 may be pulled upward by the support plate ST to be folded.

In FIG. 19, the first and second sliding units SU1 and SU2 may move in a relatively downward direction as compared to the first and second sub-hinges SG1 and SG2 and the first and second support parts SP1 and SP2. In FIG. 19, the first and second sub-hinges SG1 and SG2 and the first and second support parts SP1 and SP2 may move in a relatively upward direction as compared to the first and second hinges HG1 and HG2.

Referring to FIG. 20, when the hinge part HG is folded, since the first and second hinges HG1 and HG2 move toward the first and second support parts SP1 and SP2, the third and fourth extension parts EX3 and EX4 may be disposed adjacent to the boundary of the second groove G2. Similarly, the first and second extension parts EX1 and EX2 may also be disposed adjacent to the boundary of the first groove G1, as the third and fourth extension parts EX3 and EX4.

Referring back to FIG. 19, since the openings OP overlap the first and second rotation axes RX1 and RX2, the support plate St overlapping the first and second rotation axes RX1 and RX2 may be easily folded.

A plurality of support bars that support the folding area FA may be disposed below the folding area FA. The support bars may extend in the second direction D2 and be arranged in the first direction D1, so that the support bars are rotatably coupled to each other. However, flatness of the folding area FA may be non-uniform by the support bars. Also, when the folding area FA is folded, the folding area FA may be largely bent at edges of the support parts to cause damage of the folding area FA. Thus, the folding area FA may be deformed.

However, according to an exemplary embodiment, the support bars may not be disposed below the folding area FA, and the support plate ST and the sheet part SH, each of which has a flat structure, may be disposed. In this manner, the folding area FA may be easily supported by the support plate ST, and the flexible sheet part SH may perform a buffering action between the folding area FA and the support plate ST. As such, the deformation of the folding area FA may be prevented. Also, even though the support plate ST include metal, the portions of the support plate ST, which overlap the first and second rotation axes RX1 and RX2, may be easily folded by the openings OP.

According to the exemplary embodiments, the support plate that is capable of easily supporting the display module and the sheet part may be disposed below the folding area without disposing the joint units under the folding area to prevent the folding area from being deformed.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display module including a first non-folding area, a second non-folding area, and a folding area arranged in a first direction, the folding area being disposed between the first and second non-folding areas;
   a first support part disposed below the first non-folding area;
   a second support part disposed below the second non-folding area;
   a hinge part configured to be fold along a plurality of rotational axes spaced apart in the first direction and disposed below the folding area;
   a sheet part disposed between the folding area and the hinge part; and
   a support plate disposed between the sheet part and the hinge part, the support plate having a plurality of openings overlapping a portion of the hinge part in a plan view,
   wherein the hinge part comprises:
      a fixed part including a first body part having a substantially flat top surface and extending in a second direction crossing the first direction;
      a first hinge rotatably connected to a first side of the fixed part;
      a second hinge rotatably connected to a second side of the fixed part opposing the first side in the first direction with the first body part interposed therebetween;
      a first sub-hinge connected to the first hinge and the first support part, the first sub-hinge being disposed further away from the fixed part in the first direction than the first hinge; and
      a second sub-hinge connected to the second hinge and the second support part, the second sub-hinge being disposed further away from the fixed part in the first direction than the second hinge,
   wherein each of the fixed part, first hinge, and the second hinge overlaps at least a portion of the display module when viewed in plan,
   wherein the first and second sides of the fixed part oppose each other in the first direction,
   wherein the first hinge comprises:
      a first extension part extending in the second direction; and
      a plurality of second extension parts extending from a second side of the first extension part opposite to a first side of the first extension part facing the fixed part, in the first direction, and
   wherein the second hinge comprises:
      a third extension part extending in the second direction; and
      a plurality of fourth extension parts extending from a second side of the third extension part opposite to a first side of the third extension part facing the fixed part, in the first direction.

2. The display device of claim 1, wherein:
   the first hinge is configured to rotate about a first rotation axis, which is defined at the first side of the fixed part and extend in the second direction; and
   the second hinge is configured to rotate about a second rotation axis, which is defined at the second side of the fixed part and extend in the second direction.

3. The display device of claim 2, wherein the openings overlap the first rotation axis and the second rotation axis.

4. The display device of claim 2, wherein the openings extend in the second direction and are arranged in the first direction and the second direction, the openings comprising:
   a plurality of first openings arranged in the first direction and the second direction; and
   a plurality of second openings arranged in the first direction and the second direction and disposed between the first openings in the first direction, such that the second openings and the first openings do not entirely overlap each other in the second direction.

5. The display device of claim 1, wherein:
   the hinge part further comprises:
      a plurality of first connection parts disposed on the first and second sides of the fixed part and extending in the second direction;

a plurality of second connection parts disposed at a first side of the first hinge facing the first side of the fixed part and extending in the second direction; and a plurality of third connection parts disposed at a first side of the second hinge facing the second side of the fixed part and extending in the second direction; and the first connection parts are disposed between the second connection parts and between the third connection parts so as to be rotatably coupled to the second connection parts and the third connection parts.

6. The display device of claim 1, wherein the display module is configured to be out-folded to be exposed to the outside, such that the first support part is interposed between the first non-folding area and the second non-folding area when the first and second hinges are rotated.

7. The display device of claim 1, wherein:
the first extension part and the second extension parts are disposed in a first groove defined in a top surface of the first sub-hinge, the first groove having a shape corresponding to each of the first extension part and the second extension parts; and
the third extension part and the fourth extension parts are disposed in a second groove defined in a top surface of the second sub-hinge, the second groove having a shape corresponding to each of the third extension part and the fourth extension parts.

8. The display device of claim 7, wherein:
when the hinge part is in a flat state, the first and second extension parts are spaced apart from a boundary of the first groove, and the third and fourth extension parts are spaced apart from a boundary of the second groove; and
when the first and second hinges are rotated to fold the hinge part, the first and second extension parts are adjacent to the boundary of the first groove, and the third and fourth extension parts are adjacent to the boundary of the second groove.

9. The display device of claim 7, further comprising:
a plurality of first sliding units connected to lower portions of the second extension parts; and
a plurality of second sliding units connected to lower portions of the fourth extension parts,
wherein:
the first sliding units are disposed in first moving holes, which are defined in the first sub-hinge and extend in the first direction, the first sliding units being configured to move along the first moving holes; and
the second sliding units are disposed in second moving holes, which are defined in the second sub-hinge and extend in the first direction, the second sliding units being configured to move along the second moving holes;
the first moving holes are defined in portions of the first sub-hinge, in which the first groove is defined; and
the second moving holes are defined in portions of the second sub-hinge, in which the second groove is defined.

10. The display device of claim 9, wherein the first and second sliding units are configured to move toward the first and second support parts when the first and second hinges are rotated to fold the display module.

11. The display device of claim 9, wherein:
the first and second sliding units extend downward further than portions of the first and second sub-hinges, in which the first and second grooves are defined; and
each lower portion of the first and second sliding units has a width greater than that of each of the first and second moving holes in the second direction.

12. The display device of claim 1, wherein:
the fixed part comprises:
first and second portions respectively adjacent to the first and second sides of the fixed part and opposing each other in the second direction; and
the first body part between the first portion and the second portion;
the first sub-hinge comprises:
third and fourth portions respectively adjacent to both sides of the first sub-hinge and opposing each other in the second direction; and
a second body part between the third portion and the fourth portion;
the second sub-hinge comprises:
fifth and sixth portions respectively adjacent to both sides of the second sub-hinge and opposing each other in the second direction; and
a third body part between the fifth portion and the sixth portion;
the first portion of the fixed part is disposed between the third portion of the first sub-hinge and the fifth portion of the second sub-hinge;
the second portion of the fixed part is disposed between the fourth portion of the first sub-hinge and the sixth portion of the second sub-hinge;
the support plate and the sheet part are disposed on the first, second, and third body parts; and
the first and second hinges are disposed between the third and fourth portions of the first sub-hinge and between the fifth and sixth portions of the second sub-hinge.

13. The display device of claim 12, further comprising a plurality of joint units disposed between the first and third portions, between the first and fifth portions, between the second and fourth portions, and between the second and sixth portions, and
the joint units are rotatably coupled to the first and third portions, the first and fifth portions, the second and fourth portions, and the second and sixth portions.

14. The display device of claim 1, wherein the support plate comprises metal, and the sheet part comprises a flexible material.

15. The display device of claim 1, wherein the first body part of the fixed part is not configured to be bent when the display device is folded.

16. The display device of claim 1, wherein:
the fixed part further includes a first part and a second part opposing each other in the second direction;
the first part and the second part do not overlap the first body part;
top surfaces of the first part and the second part are disposed at a higher elevation than the top surface of the first body part; and
the sheet part is disposed between the first part and the second part.

* * * * *